Patented Apr. 25, 1950

2,505,699

UNITED STATES PATENT OFFICE 2,505,699

INSECTICIDAL COMPOSITIONS CONTAINING PYRETHRUM EXTRACTS AND PIPERONYL CYCLOHEXENONES

Herman Wachs, Brooklyn, and Kurt Kulka, New York, N. Y., assignors, by mesne assignments, to U. S. Industrial Chemicals, Inc., New York, N. Y., a corporation of Delaware No Drawing. Application February 27, 1946, Serial No. 650,726

10 Claims. (Cl. 167—24)

This invention relates to insecticide compositions and more particularly compositions made by dissolving resinuous extracts containing pyrethrins, etc., and active cyclohexenone compounds in special high boiling solvents which enable substantially complete solution to be obtained of the dissolved constituents.

Commercial pyrethrum extracts made by extracting pyrethrum flowers with various solvents vary in concentration and purity. Such extracts, on removal of the solvents, are resinuous or oleoresinous in character. Such extracts, concentrates or oleoresins of pyrethrum are used in the preparation of insecticides in various ways, as by dissolving in Freon, as in the so-called "aerosol bombs" (Goodhue, Ind. Eng. Chem., 34, 1456), or by diluting with a suitable petroleum fraction to form a so-called "household spray," or by combining with an emulsifying agent to make them miscible with water so that they may be used in a so-called "horticultural spray" or in an animal spray or dip or by physically incorporating them into a suitable finely powdered absorbent material for use as a dust insecticide. The use of such resinous extracts, however, present difficulties because of incomplete solution in the solvent used or inhibition of their activity by the occlusion of the pyrethrins in the resinous precipitate or colloidal suspension which results when other natural substances are present in the extract and are not completely soluble in the medium employed.

It is known that various compounds containing cyclohexenone rings and also containing the piperonyl (3,4-methylene dioxy-phenyl) group are valuable constituents of insecticide compositions and have a synergistic effect for pyrethrum. These synergistic compounds when commercially prepared are mixtures which are partially crystallized, semi-solid and very little soluble in petroleum fractions and practically insoluble in Freon.

The present invention enables the objections and limitations above mentioned in the use of pyrethrum extracts to be overcome and enables such cyclohexenone synergists to be used in a particularly effective way and with complete or substantially complete solution of the resinous constituents of the commercial pyrethrum extracts and of the cyclohexenone synergists, thereby enabling these constituents to be used in an effective state of solution.

We have found that certain compounds which have little or no insecticidal activity of their own have the valuable property of dissolving both the resinous constituents of the pyrethrum extracts and of the cyclohexenone synergists, thereby making available the pyrethrins so that their activity is not inhibited by occlusion in resinous precipitates or colloidal suspension and also making available and effective the synergistic action of the cyclohexenone compounds on the pyrethrins.

The present invention enables solutions and also impregnated dust to be made from pyrethrum extracts with all of the constituents of the extracts in solution, as well as with the cyclohexenone synergist in solution. When these solutions are impregnated on or in an absorbent carrier for making impregnated dusts, the pyrethrum extracts and the synergists will be held by an essentially nonvolatile solvent so that the solvent will remain in association with the active insecticidal principles in the impregnated dusts and thereby increase the degree of contact between the active principles and the insect.

The cyclohexenone synergists which are used with the pyrethrum extracts and the high boiling solvents in the new compositions can be made e. g. from piperonal and methyl ketones, such as methyl-hexyl ketone and condensing the piperonal methyl-hexyl ketone product under alkaline conditions with ethylacetoacetate or other esters of acetoacetic acid such as the methyl or isobutyl esters. The reaction results in the formation of compounds containing the piperonyl group and also containing a cyclohexenone ring. Thus, when piperonal is condensed with methyl hexyl ketone to form the 3,4-methylene-dioxy-styryl-hexyl ketone (piperonal-methyl-hexyl-ketone) and this is condensed with ethylacetoacetate or similar esters, the resulting product is essentially a mixture of (3,4-methylene-dioxy)phenyl-5-hexyl-cyclohexen(4,5)-one(3) and (3,4-methylene-dioxy)phenyl-2-alkyl-carboxy-5-hexyl-cyclohexen(4,5)-one(3). Similar piperonyl cyclohexenones can be produced by the use of other ketones for condensation with piperonal and by the use of different esters of acetoacetic acid (application Serial No. 520,099), now abandoned.

In the piperonyl cyclohexenone compounds formed, there may be varying proportions of the esterified and unesterified ketone (cyclohexenone). The ester form may thus be present, for example, to the extent of approximately 30 percent. For practical purposes, the mixture is employed in making the insecticidal preparations. When, however, the mixture is allowed to stand for a considerable length of time, the ketone form (unesterified) of the product will begin to crystallize and the product as a whole is very little soluble in petroleum fractions and practically insoluble in Freon.

The non-volatile solvents which are used for dissolving the insecticidal resins and the cyclohexenone synergist may be represented by the following general forumla:

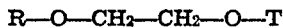

in which R is an alkyl substituted aryl radical with from 3 to 8 alkyl carbon atoms and in which T represents or includes the group, —CH=CH$_2$, —CH$_2$—CH$_2$Cl or —CH$_2$—CH$_2$OH The alkyl substituent or substituents may be a single alkyl group or two or more alkyl groups with the total number of carbon atoms not less than 3 and not more than 8. In the case of a dialkyl substituted aryl group the compounds may be represented by the following general formula:

where T has the meaning above indicated and where R and S are alkyl groups and $n$ and $m$ the number of carbon atoms in the alkyl groups with the sum of $n+m$ not less than 3 or more than 8.

The compounds in which T is the chlorethyl group (—CH$_2$—CH$_2$Cl) may be readily prepared by reacting the dry sodium salts of the corresponding alkyl substituted phenols with dichlordiethylether. When sodium hydroxide is used in an amount which is somewhat in excess of that required to form the phenylate with the phenol, the formation of the above compound may be accompanied by the formation of the other compounds so that the resulting product is a mixture of all three of the above compounds, that is, with T having the meanings above indicated. Some dialkyldiphenylethers may also be formed by reaction of two mols of the alkyl phenylate with one mol of dichlordiethylether, but these are non-volatile and can be separated from the product by vacuum distillation of the product.

Various alkyl phenols can be reacted with the dichlordiethylether in making the new solvents, the alkyl phenols containing from 3 to 8 carbon atoms in the alkyl substituent or substituents. Among the alkyl phenols which can be so used are butyl and amyl phenols, carvacrol, thymol, parathymol, butyl cresol, diethylphenol, dibutylphenol, amyl cresol, diethylcresol, hexylcresol, hexylphenol, etc. A particularly advantageous form of alkyl phenol is the mixture of alkyl phenols obtained as a byproduct in the manufacture of thymol, this mixture containing essentially isopropyl cresols (such as parathymol) and diisopropyl cresols.

The production of the high boiling and substantially non-volatile solvents will be further illustrated by the following examples but it will be understood that the invention is not limited thereto. The parts are by weight:

*Example I.*—A mixture of 176 parts of sodium hydroxide, 900 parts of isopropanol and 600 parts of thymol is agitated under a reflux condenser until a clear solution is obtained and 1144 parts of dichlordiethylether are added and this mixture agitated on a steam bath under reflux for 36 hours, the isopropanol is then distilled off, the remainder is washed with water, the excess of isopropyl ether is removed on a steam bath under a vacuum of about 500 mm. and the residue is then distilled from an oil bath under a vacuum of about 5 mm. A colorless oil is obtained as a distillate at a temperature range of 167–170° C. at 5 mm. The principal constituent of this oil is a compound having the formula:

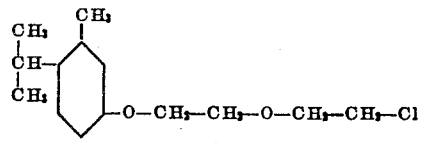

To some extent the action of the caustic soda present in the original reaction mixture may remove chlorine and convert the above compound into a compound in which the terminal group is —CH=CH$_2$ instead of —CH$_2$—CH$_2$Cl. To the extent that hydrolysis takes place some of the chlorine compound may be converted to the hydroxy compound having the terminal group —CH$_2$—CH$_2$OH.

The chloride formed in the above example may be converted more or less completely into a mixture of the corresponding unsaturated compound and the alcohol by prolonged heating with an excess of alkali in isopropanol solution, as illustrated by the following example:

*Example II*—A mixture of 257 parts of the chloride of Example I and of the formula there indicated is mixed with 60 parts of sodium hydroxide and 600 parts of isopropanol and refluxed for 48 hours. The solvent is then distilled off, the oil washed with water, and then distilled in vacuo. A highly unsaturated mixture distills over within the boiling range of 124–157° C. at 1 mm.

The compounds in which T of the above formula is —CH$_2$—CH$_2$Cl or CH$_2$—CH$_2$OH or —CH$_2$=CH$_2$ are all effective solvents and under the conditions of the reactions described above all three seem to be present to a smaller or larger extent and they do not lend themselves to easy separation. The solvent power of the composition containing an equal number of carbons in the alkyl substituents of the benzene ring is of similar order whether the chloride predominates or whether the unsaturated group predominates, provided the sum of the carbon atoms on the alkyl substituent or substituents of the benzene ring is a minimum of 3 and a maximum of 8. Such products are capable of separation from the reaction mixture by vacuum distillation under a high vacuum, thereby obtaining them free from any diphenylethers which may be simultaneously formed by the reaction of two mols of alkyl phenol with one mol of dichlordiethylether. These alkyl substituted diphenylethers are not satisfactory solvents and when present reduce the solvent power of the compounds above described.

The high boiling solvents produce as above described are valuable solvents for dissolving pyrethrum extracts and resins and also for dissolving the cyclohexenone synergists. We have found that when both the pyrethrum extracts and the cyclohexenone synergists are dissolved in such solvents, the resulting solution may then be readily diluted with solvent-diluents, such as Freon or petroleum fractions to form clear solutions. As a result, a substantially constant and consistently high insect kill can be obtained.

When the solution is mixed with the carriers and used as insecticidal dust, the high boiling solvent used prevents the formation of crystals and the toxic ingredients are thus present in an oily form which makes them far more active against the insects on attack.

Thus, an effective insecticidal mixture for combatting flies should should the approximate composition of 30 mg. of pyrethrins and 300 mg. of the mixture of piperonyl cyclohexenones above described in 100 cc. of kerosene, but due to the presence of resinous matter in the pyrethrum extract and the partial insolubility of the cyclohexenones, the ingredients will not dissolve satisfactorily in the kerosene. When, however, the pyrethrins and cyclohexenones are dissolved in the high boiling solvents of the above examples, the resulting solution can be readily diluted with kerosene to give a satisfactory insecticidal solution.

As an example of such a composition, a concentrate is produced containing 3 parts by weight of 20 percent pyrethrum extract, 6 parts of the mixed piperonyl cyclohexenones above described, 6 parts of the solvents of the above examples, and about 5 parts of kerosene. The concentrate thus produced and containing the insecticidal constituents in solution is completely miscible with kerosene in all proportions and will give clear solutions which will not block the finest openings of the spraying apparatus.

By diluting the concentrate with 100 parts of kerosene to 1 part of concentrate, a solution is obtained of the desired strength of about 30 mg. pyrethrins and 300 mg. of the piperonyl cyclohexenones in 100 cc. kerosene.

A highly effective dust base for agricultural purposes can be prepared by impregnating on an inert carrier a solution containing pyrethrins and the synergists dissolved in the high boiling solvent and using an amount of the solution so that the dust base will contain about 0.2 percent of pyrethrins and 2.5 percent of the piperonyl cylcohexenones. Such a solution is readily made by dissolving the mixed piperonyl cyclohexenones in the high boiling solvent and then adding the required amount of pyrethrins. The result is a clear solution of the pyrethrins and of the synergist in a non-volatile solvent which will readily mix with the inert carrier to give uniform coverage of particles of the carrier.

The impregnated base thus produced may be converted into a finished insecticide by mixing it with approximately 4 parts of an inert carrier, such as pyrophyllite or talc. This finished dust was found to be effective in the field against leafhoppers, Mexican bean beetles, imported green cabbage worms, cabbage loopers, diamond-back larvae, and harlequin bugs.

The new composition is well adapted for use by dissolving in Freon to form so-called aerosol bombs.

The piperonyl cyclohexenones used as synergists do not dissolve in Freon, and 2 layers are produced when the ingredients are mixed in a pressure tube. When, however, the piperonyl cyclohexenones are mixed with an equal weight of the high boiling solvent of the above examples, the resulting solution of the synergist in the solvent becomes completely soluble in Freon. Thus a highly effective Freon spray may be produced by dissolving 2 percent of pyrethrum extract, 3 percent of the piperonyl cyclohexenones, and 3 percent of the high boiling solvents of the above examples in Freon; and 4 percent of cottonseed oil may be added to increase the particle size of the spray.

The new compositions made by dissolving the pyrethrum extracts and piperonyl cyclohexenones in the high boiling solvents thus present many advantages. The solvents used are very high boiling and for practical purposes non-volatile under conditions of use. They are odorless and relatively non-toxic to domestic animals and humans and are non-irritating to the nose and to the skin, so that they may be readily used in indoor sprays while they exert a preservative action for the easily oxidized and reactive compounds, such as pyrethrins and rotenones.

The new compositions make possible the use of both pyrethrum extracts and the piperonyl cyclohexenones to particular advantage, so that effective action of the pyrethrin is obtained as well as effective synergistic action of the cyclohexenone compounds.

We claim:

1. A concentrated insecticide composition comprising pyrethrum extract containing resinous material, a piperonyl cyclohexenone synergist, and a liquid solvent for the pyrethrum extract, including the resinous material thereof, and the synergist having the following formula:

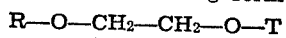

$$R-O-CH_2-CH_2-O-T$$

where R is an alkyl substituted and otherwise unsubstituted phenyl group having from 3 to 8 alkyl carbons and T is selected from the group which consists of

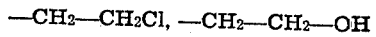

$$-CH_2-CH_2Cl, -CH_2-CH_2-OH$$

and $-CH=CH_2$, said liquid solvent being miscible with petroleum solvents and dichlorodifluoromethane, in which resinous portions of the pyrethrum extract and the synergist are not more than slightly soluble, whereby the concentrated composition, including the resinous material of the extract, and the synergist readily may be put into solution in such solvent-diluents.

2. A concentrated insecticide composition as set forth in claim 1 in which the synergist includes (3,4-methylene-dioxy) phenyl-5-hexyl cyclohexen (4,5)-one (3).

3. A concentrated insecticide composition as set forth in claim 1 in which the synergist includes (3,4-methylene-dioxy) phenyl-2-alkyl-carboxy-5-hexyl-cyclohexen (4,5)-one (3).

4. A concentrated insecticide composition as set forth in claim 1 in which the synergist is a mixture of (3,4-methylene-dioxy) phenyl-5-hexyl cyclohexen (4,5)-one (3) and (3,4-methylene-dioxy) phenyl-2-alkyl-carboxy-5-hexyl-cyclohexen (4,5)-one (3).

5. A concentrated insecticide composition as set forth in claim 1 in which R is the 3-methyl-4-isopropylphenyl radical.

6. An insecticide composition comprising a solvent-diluent, pyrethrum extract containing resinous material normally insoluble in said solvent-diluent, a piperonyl cyclohexenone synergist which is not more than slightly soluble in said solvent-diluent, and a liquid solvent for such insoluble resinous material and said synergist which is miscible with the solvent-diluent, whereby such normally insoluble resinous material and said synergist are placed in solution in the solvent-diluent, said liquid solvent having the following formula:

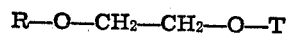

$$R-O-CH_2-CH_2-O-T$$

where R is an alkyl substituted and otherwise unsubstituted phenyl group having from 3 to 8 alkyl carbons and T is selected from the group which consists of

$$-CH_2-CH_2Cl, -CH_2-CH_2-OH$$

and $-CH=CH_2$.

7. An insecticide composition as set forth in claim 6 in which the synergist includes (3,4- methylene - dioxy) phenyl - 5 - hexyl cyclohexen (4,5)-one (3).

8. An insecticide composition as set forth in claim 6 in which the synergist includes (3,4-methylene - dioxy) phenyl - 2 - alkyl - carboxy - 5-hexyl-cyclohexen (4,5)-one (3).

9. An insecticide composition as set forth in claim 6 in which the synergist is a mixture of (3,4 - methylene - dioxy) phenyl - 5 - hexyl cyclohexen (4,5)-one (3) and (3,4-methylene-dioxy) phenyl - 2 - alkyl - carboxy - 5 - hexyl - cyclohexen (4,5)-one (3).

10. An insecticide composition as set forth in claim 6 in which R is the 3-methyl-4-isopropyl-phenyl radical.

HERMAN WACHS.
KURT KULKA.

REFERENCES CITED

The following references are of record in the file of this patent:

UNITED STATES PATENTS

| Number | Name | Date |
|---|---|---|
| 1,633,927 | Davidson | June 28, 1927 |
| 2,097,441 | Bruson | Nov. 2, 1937 |
| 2,098,203 | Bruson | Nov. 2, 1937 |
| 2,205,394 | Coleman et al. | June 25, 1940 |
| 2,210,900 | Coleman | Aug. 13, 1940 |

OTHER REFERENCES

Synerholm et al., Proceedings of Boyce-Thompson Institute for Plant Research, vol. 14, No. 2, Oct. 1945, pages 79 and 80.